US009251353B2

(12) United States Patent
Jaber et al.

(10) Patent No.: US 9,251,353 B2
(45) Date of Patent: *Feb. 2, 2016

(54) SECURE CACHING OF SERVER CREDENTIALS

(71) Applicant: Dell Products L.P., Round Rock, TX (US)

(72) Inventors: Muhammed K. Jaber, Austin, TX (US); Mukund P. Khatri, Austin, TX (US); Kevin T. Marks, Round Rock, TX (US); Don Charles McCall, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/707,196

(22) Filed: Dec. 6, 2012

(65) Prior Publication Data

US 2013/0097681 A1    Apr. 18, 2013

Related U.S. Application Data

(63) Continuation of application No. 12/256,831, filed on Oct. 23, 2008, now Pat. No. 8,353,026.

(51) Int. Cl.
*G06F 21/44* (2013.01)
*G06F 21/60* (2013.01)
*G06F 21/31* (2013.01)
*G06F 21/86* (2013.01)

(52) U.S. Cl.
CPC .............. *G06F 21/60* (2013.01); *G06F 21/31* (2013.01); *G06F 21/86* (2013.01); *G06F 2221/2143* (2013.01)

(58) Field of Classification Search
CPC ........ G06F 21/86; G06F 21/575; G06F 21/31
USPC .............................................. 726/6
See application file for complete search history.

(56) References Cited

U.S. PATENT DOCUMENTS

| | | | | |
|---|---|---|---|---|
| 5,287,519 | A | * | 2/1994 | Dayan ............... G06F 21/31 340/5.74 |
| 6,101,608 | A | * | 8/2000 | Schmidt et al. ............ 726/2 |
| 6,105,136 | A | * | 8/2000 | Cromer ............... G06F 21/78 709/218 |
| 6,292,898 | B1 | | 9/2001 | Sutherland |
| 6,973,587 | B1 | | 12/2005 | Maity et al. |
| 7,124,435 | B1 | | 10/2006 | Richard |
| 7,254,709 | B1 | | 8/2007 | Richard |
| 7,356,601 | B1 | | 4/2008 | Clymer et al. |
| 7,787,256 | B2 | * | 8/2010 | Chan ............... G06F 21/87 174/250 |
| 7,962,713 | B2 | * | 6/2011 | Okaue ............ G06F 21/6209 711/163 |
| 8,561,138 | B2 | * | 10/2013 | Rothman ............ G06F 21/35 455/456.1 |
| 2003/0120918 | A1 | * | 6/2003 | VanDer Kamp ............ 713/164 |
| 2005/0033970 | A1 | | 2/2005 | Anson et al. |

(Continued)

*Primary Examiner* — Izunna Okeke
*Assistant Examiner* — Bryan Wright
(74) *Attorney, Agent, or Firm* — Haynes and Boone, LLP

(57) ABSTRACT

A credential caching system includes receiving a set of authentication credentials, storing the set of authentication credentials in a credential cache memory, wherein the credential cache memory is coupled with a management controller, and supplying the set of authentication credentials for automatic authentication during a reset or reboot. In the event of a security breach, the credential caching system clears the set of authentication credentials from the credential cache memory so that the set of authentication credentials may no longer be used for a reset or reboot.

20 Claims, 2 Drawing Sheets

(56) References Cited

U.S. PATENT DOCUMENTS

| | | |
|---|---|---|
| 2005/0278778 A1 | 12/2005 | D'Agostino et al. |
| 2005/0289357 A1* | 12/2005 | Han .............................. 713/184 |
| 2006/0047946 A1* | 3/2006 | Keith, Jr. ............................ 713/2 |
| 2006/0090085 A1* | 4/2006 | McKenney et al. ........... 713/193 |
| 2006/0095957 A1 | 5/2006 | Lundblade et al. |
| 2006/0161790 A1* | 7/2006 | Hunter et al. ................. 713/189 |
| 2007/0192581 A1* | 8/2007 | Challener et al. ................. 713/2 |
| 2008/0082813 A1 | 4/2008 | Chow et al. |
| 2009/0173790 A1* | 7/2009 | Hart ..................... G06Q 20/382 235/449 |
| 2010/0100733 A1 | 4/2010 | Jaber et al. |

* cited by examiner

SECURE CACHING OF SERVER CREDENTIALS

This application claims priority to and is a continuation of 12/256,831 filed Oct. 23, 2008, which is incorporated herein by reference in its entirety.

BACKGROUND

The present disclosure relates generally to information handling systems, and more particularly to a secure caching of server credentials for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

There is a concern for protecting data on IHS systems from theft or misappropriation. This concern will continue to grow as hackers and thieves become even more sophisticated in their methods for gaining this data and information. One can impose many levels of protection to an IHS and related components by adding the need for credentials, such as operating system passwords, BIOS passwords, hard disk drive (HDD) passwords, trusted platform module (TPM) authentication data (authdata), physical keys, hardware keys (e.g., USB keys) and a variety of other security features for different components or modules of the IHS. Adding these security features imposes a level of difficulty in a data center environment because a data center may have many IHSs, (e.g., IHS servers) and the IHSs may be expected to boot or reset with no physical human intervention, and as fast as possible. In fact, in some data centers, if the security feature requires human intervention every boot, or if it slows down the reboot process significantly, it may not get deployed in the data center.

Accordingly, it would be desirable to provide for secure caching of server credentials for an IHS to add security without requiring human intervention absent the disadvantages discussed above.

SUMMARY

According to one embodiment, a credential caching system includes receiving a set of authentication credentials, storing the set of authentication credentials in a credential cache memory, wherein the credential cache memory is coupled with a management controller, and supplying the set of authentication credentials for automatic authentication during a reset or reboot. In the event of a security breach, the credential caching system clears the set of authentication credentials from the credential cache memory so that the set of authentication credentials may no longer be used for a reset or reboot.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
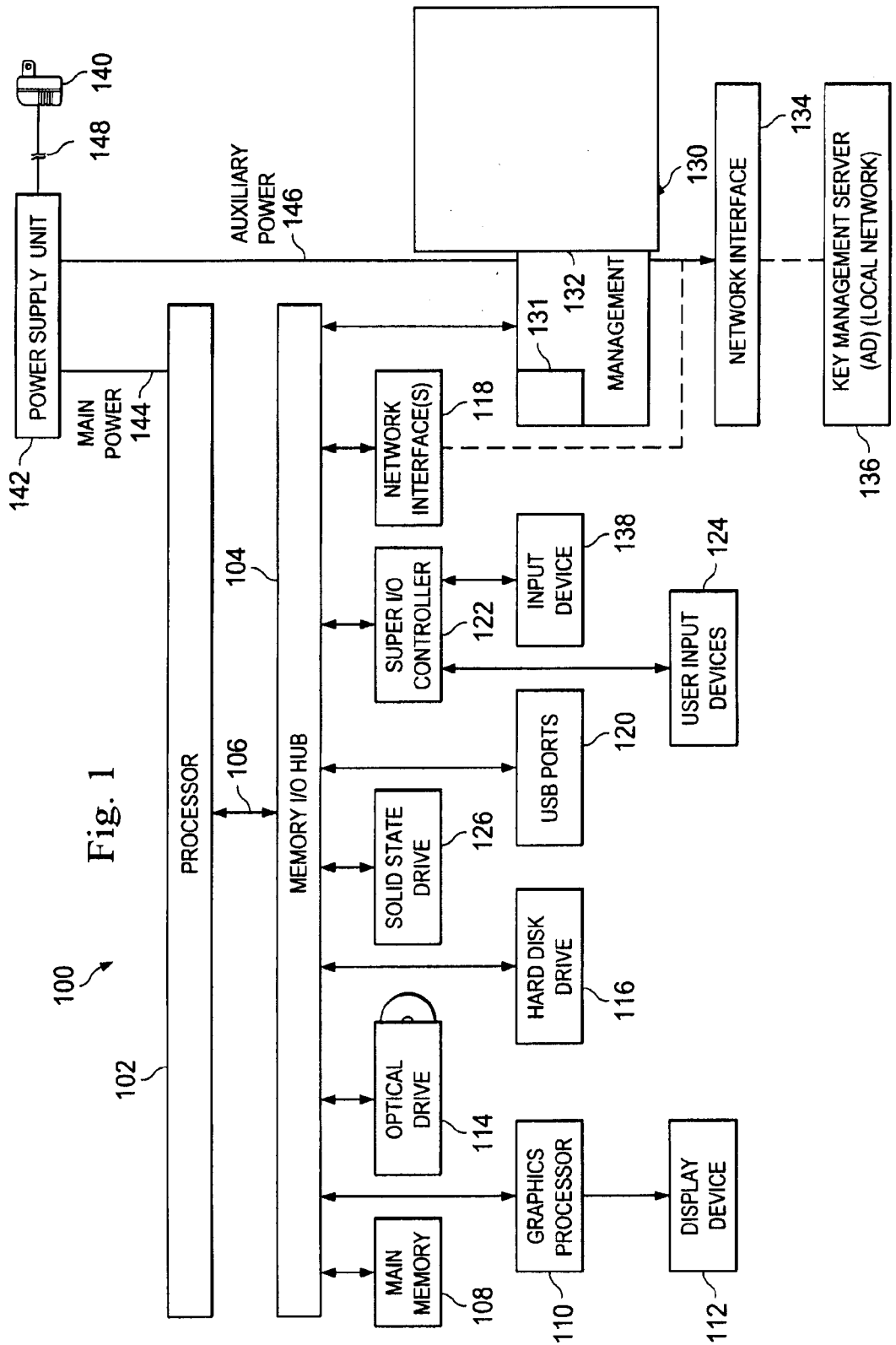
FIG. 1 illustrates an embodiment of an information handling system (IHS).

FIG. 1 is a block diagram of one IHS 100. The IHS 100 includes a processor 102 such as an Intel Pentium TM series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

FIG. 1 also includes a management controller 130, such as a remote access controller (RAC), coupled with the memory I/O hub 104. The management controller 130 generally provides out-of-band management. The controller 130 may have has its own processor 131, battery (not shown) or auxiliary power, network connection, access to the system bus, and memory. In an embodiment, a portion of the memory the memory is used as the credential cache 132. In an embodiment, the credential cache 132 is a separate memory. The credential cache 132 may be a volatile or a non-volatile memory device. However, using a volatile memory device of the credential cache 132 allows the credential cache 132 to lose data stored in the memory, such as any authentication credentials stored in the cache 132 when power to the memory device is removed. The controller 130 may perform power management, virtual media access and remote console. A controller 130 may allow a user, such as a system administrator, to configure an IHS 100 as if the user were sitting at the local console coupled with the IHS 100. Using the controller 130, a user may login and reboot the IHS even if the core operating system has crashed. The controller 130 may include a network interface 134, which may be coupled with the network interface 118. The network interface 134 allows the controller 130 to couple with and communicate with other IHSs 100 via a network system. For example, the network interface 134 allows the controller 130 to couple with a key management server 136 using a local network system. The key management server 136 may include an active application directory (AD) or other type of directory services protocol, such as the Lightweight Directory Access Protocol (LDAP). An LDAP is generally understood in the art as an application protocol for querying and modifying directory services running over a network protocol, such as TCP/IP. It should be understood that other protocols may be used with the present disclosure for storing credentials.

FIG. 1 also includes a plug-in, or other connection to a line voltage source 140. A power supply unit 142 utilizes the power from the voltage source connector 140 to provide main power 144 and auxiliary power 146 to the processor 102 and the controller 130. As discussed above, the credential cache 132 may lose data (e.g., authentication credentials) stored in the credential cache 132 when power is lost by breaking the power line, such as breaking the power to the power supply unit 142 at a point of break 148. However, the power may be broken to the credential cache 132 at other locations and via ways other than unplugging the IHS 100. Thus, if a someone tries to physically remove the IHS 100 from its proper location, rack, or etc., such as by trying to steal the IHS 100, the credentials will be lost and the IHS 100 will not be properly usable.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

An embodiment of the present disclosure provides a credential caching system that may be automatically accessed without human intervention to protect a server IHS's credentials where an unauthorized user or machine, such as a hacker or thief, is not able to get to the local cache store once the server is unplugged and moved out of the data center or otherwise breaches security, such as by opening a chassis of the IHS 100. In an embodiment, the credential cache 132 is stored in volatile memory, which will store the credentials as long as the volatile memory holding the credentials maintains power. As such, this system allows for fast booting of server or other IHSs 100 without user intervention if the IHS 100 is not physically removed from its power source. Thus, the present disclosure is well suited for IHSs 100 in the form of servers, workstations, notebooks, desktops, or any variety of other IHSs 100. The present disclosure may include the credential cache memory 132 within a chassis of the IHS 100 and/or on-board with the controller 130. However, it should be understood that other locations for the cache 132 may be used.

Figure 2:
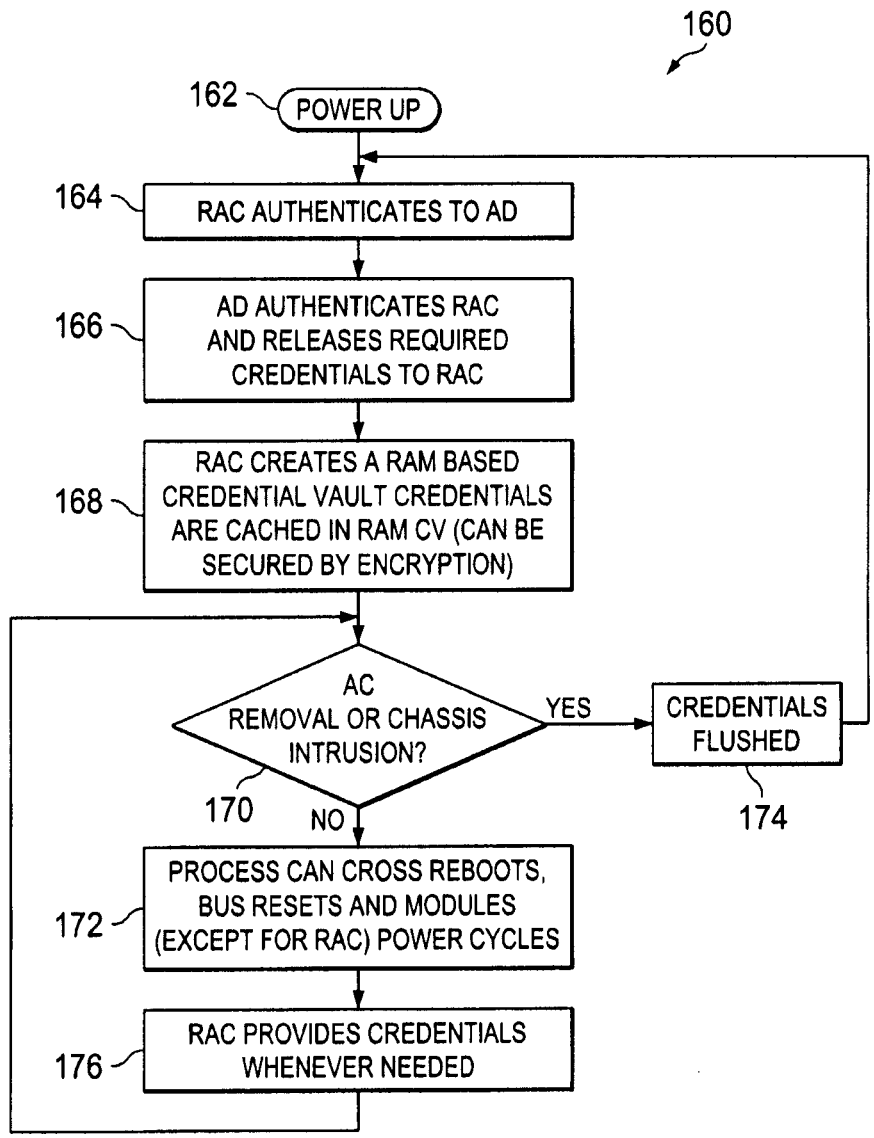
FIG. 2 illustrates an embodiment of a method for secure caching of server IHS credentials.

FIG. 2 illustrates an embodiment of a method 160 for secure caching of server IHS credentials. The method 160 begins at 162 where the IHS 100 is powered up. The method 160 then proceeds to block 164 where controller 130 couples to the key management server 136 and authenticates to an active directory (AD) or other directory service in the key management server 136. The method 160 then proceeds to block 166 where directory service authenticates the controller 130 and releases authentication credentials to the controller 130. Then, the method 160 proceeds to block 168 where the controller 130 creates a credential cache 132 where the authentication credentials are cached/stored in the credential cache memory 132. In an embodiment, the cache 132 may be volatile random access memory (RAM). In an embodiment, the credentials may be secured by encryption or other security methods. The method 160 then proceeds to decision block 170 where the method 160 determines whether there has been a loss of power, a chassis intrusion, or other breach or security, which may be detected using chassis door sensor or other input device 138. If no, there has not been some breach of security, the method 160 proceeds to block 172 when the IHS 100 receives a command to reboot, reset the communication bus and/or other command requiring the credentials stored on board in the credential cache 132. If yes, there has been some breach of security, the method 160 proceeds to block 174 where the authentication credentials in the credential cache 132 are flushed or otherwise cleared from the credential cache 132. Thus future reboots/resets of the IHS 100 require the method 160 to return to block 164 where the authentication is performed using an off-chassis authentication via the key management server 136. After block 172, the method 160 then proceeds to block 176, where the controller 130 provides the credentials whenever needed for the reboots, resets, and etc. The method 160 then loops back to block 170.

In summary, the present disclosure utilizes the fact that many IHS 100 service processors (e.g., a management controller/remote access controller) is rarely powered down, even when the rest of the system (e.g., the host processor 102) is reset or when the operating system reboots the IHS 100. The IHS 100 may undergo many resets/reboots each day, therefore, it becomes impractical to manually authenticate or provide credentials, such as HDD passwords, TPM "authdata", or the like to the IHS 100 on every reboot/reset. On the other hand, the IHS 100 ensures that theft (e.g., physical unplugging and carrying away) and/or chassis intrusion will cause the credentials to be flushed out of the credential cache 132.

An embodiment of the secure caching of server credentials of the present disclosure is illustrated when the IHS 100 is plugged in and powered up. Then, the controller 130 authenticates to an AD, for example, and obtains system authentication credentials. Once gathered, the IHS's credentials are stored locally in the controller 130 service processor's RAM credential cache 132, which may or may not be encrypted or otherwise secured. The system module, needing its own credentials, obtains them from controller 130, directly or via a proxy. The controller 130 may then decrypt the credentials, if they are encrypted, prior to passing the credentials down the chain. Then, the IHS 100 continues to boot normally and perform work (e.g., operating system (OS) level tasks).

From time to time an administrator or other user may need to reboot the IHS 100 machine (e.g. after applying a security patch). In this case the IHS 100 reboots where the host and modules on the main system buses, such as PCI-E will reset.

This will, in general, cause modules in need of credentials to lock awaiting the secret key to be unlocked. System modules needing their own credentials may obtain them from the controller 130 either directly or via a proxy. Without any loss of power or other security breach to the controller 130, the controller 130 still has the credentials cached in the credential cache 132 and can provide them to modules within its trust domain. After the modules receive the proper credentials from the cache 132, the system uses the credentials to boot properly. However, in an example, if a hacker, thief or other unauthorized person, who is interested in the data and secrets on the IHS 100, unplugs the IHS 100 and carries it home, then when the unauthorized person powers up the IHS 100 to get the sensitive data from the drives (e.g., the HDD 116, the solid state drive 126) the unauthorized person finds out that IHS 100 is prompting for authentication credentials and fails to properly boot. This is because the controller 130 could not find the previously cached credentials as they have been cleared out of the credential cache 132 upon loss of power to the IHS 100. In another example, if a user, such as a malicious employee, is aware of the fact that the secrets are inaccessible if the IHS 100 is unplugged, but still wants to access information, such as secrets, on the IHS 100 by doing some probing while the machine is still powered, and this user opens the chassis of the IHS 100 (e.g., a monolithic tower server) and starts probing around the systems and methods of the present disclosure again clear out the credentials in the credential cache 132 after a chassis intrusion was detected. Therefore, the data remains secure.

It is noted that the general overall reference in this disclosure is that the key management server 136 is accessed via management controller 130 and the credential cache 132 is also in the mgmt controller domain. An alternate to this is to have the key management server 136 accessed directly via a UEFI environment (or BIOS with network stack included) (e.g., in server design that does not have a management controller 130 or chooses to not implement this design using management controller 130) and hold the credential cache 132 in a BIOS/host controller's domain.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A credential security system, comprising: a management controller that is configured to be coupled to an information handling system (IHS) and to remain powered when the IHS is reset or rebooted, wherein the management controller is further configured to: receive at least one authentication credential that is required by the IHS to authenticate for a boot process;
    store the at least one authentication credential in a memory that is coupled to the management controller, wherein the at least one authentication credential remains stored in the memory when the IHS is reset or rebooted due to the management controller remaining powered when the IHS is reset or rebooted;
    and automatically supply the at least one authentication credential to the IHS for automatic authentication in response to a reset or reboot of the IHS, wherein the automatic authentication of the at least one authentication credential by the IHS allows the IHS to perform a subsequent boot process;
    wherein the at least one authentication credential is automatically cleared from the memory in response to a security breach and wherein the automatic supplying of the at least one authentication credential to the IHS for automatic authentication in response to the reset or reboot of the IHS requires the at least one authentication credential to again be received and stored in the memory.

2. The system of claim 1, wherein the memory is a volatile random access memory (RAM) that is coupled to the management controller to remain powered when the IHS is reset or rebooted.

3. The system of claim 1, wherein the security breach includes a loss of power to the memory that automatically clears the at least one authentication credential from the memory.

4. The system of claim 1, wherein the security breach includes a detection of an intrusion of a chassis by the management controller.

5. The system of claim 1, wherein the at least one authentication credential is received from a server over a local network after authenticating to a directory.

6. The system of claim 1, wherein the management controller includes a remote access controller having an on-board processor and the memory.

7. The system of claim 1, wherein the at least one authentication credential is encrypted in the memory.

8. An information handling system (IHS) security system, comprising: an IHS including an IHS processor coupled to an IHS memory, wherein the IHS is configured to lock in response to a reset or reboot; and a management controller coupled to the IHS and a network, wherein the management controller remains powered when the IHS is reset or rebooted, and wherein the management controller:
    receives at least one authentication credential over the network; stores the at least one authentication credential in a management controller memory that receives power from the management controller, wherein the at least one authentication credential remains stored in the management controller memory when the IHS is reset or rebooted due to the management controller remaining powered when the IHS is reset or rebooted;
    and automatically supplies the at least one authentication credential to the IHS during a reset or reboot of the IHS, wherein the IHS is configured to automatically use the at least one authentication credential to unlock following the reset or reboot of the IHS;
    wherein the at least one authentication credential is automatically cleared from the management controller memory in response to a security breach wherein the at least one authentication credential is automatically cleared from the memory in response to a security breach and wherein the automatic supplying of the at least one authentication credential to the IHS for automatic authentication in response to the reset or reboot of the IHS requires the at least one authentication credential to again be received and stored in the memory.

9. The IHS security system of claim 8, wherein the management controller memory is a volatile random access memory (RAM) that receives power from the management controller to remain powered when the IHS is reset or rebooted.

10. The IHS security system of claim 8, wherein the security breach includes a loss of power to the memory that automatically clears the at least one authentication credential from the memory.

11. The IHS security system of claim 8, wherein the security breach includes a detection of an intrusion of a chassis by the management controller.

12. The IHS security system of claim 8, wherein the at least one authentication credential is received from a server over a local network after authenticating to a directory.

13. The IHS security system of claim 8, wherein the management controller includes a remote access controller having an on-board processor and the management controller memory.

14. The IHS security system of claim 8, wherein the at least one authentication credential is encrypted in the management controller memory.

15. A method for securing credentials, comprising: receiving at least one authentication password by a management controller that is coupled to an information handling system (IHS) and that remains powered when the IHS is reset or rebooted;
storing the at least one authentication password in a memory that is coupled to the management controller, wherein the at least one authentication password remains stored in the memory when the IHS is reset or rebooted due to the management controller remaining powered when the IHS is reset or rebooted;
and automatically supplying the at least one authentication password to the IHS for automatic authentication by the IHS in response to a reset or reboot of the IHS;
wherein the at least one authentication password is automatically cleared from the memory in response to a security breach and wherein the automatic supplying of the at least one authentication credential to the IHS for automatic authentication in response to the reset or reboot of the IHS requires the at least one authentication credential to again be received and stored in the memory.

16. The method of claim 15, wherein the memory is a volatile random access memory (RAM) that is coupled to the management controller to remain powered when the IHS is reset or rebooted.

17. The method of claim 15, wherein the security breach includes a loss of power to the memory that automatically clears the at least one authentication password from the memory.

18. The method of claim 15, wherein the security breach includes a detection of an intrusion of a chassis by the management controller.

19. The method of claim 15, further comprising:
authenticating the management controller to a directory service in response to the management controller being powered up.

20. The method of claim 15, wherein the at least one authentication password is encrypted in the memory.

* * * * *